No. 835,092. PATENTED NOV. 6, 1906.
F. J. BEARD.
BRIDLE BIT.
APPLICATION FILED APR. 18, 1905.
3 SHEETS—SHEET 1.
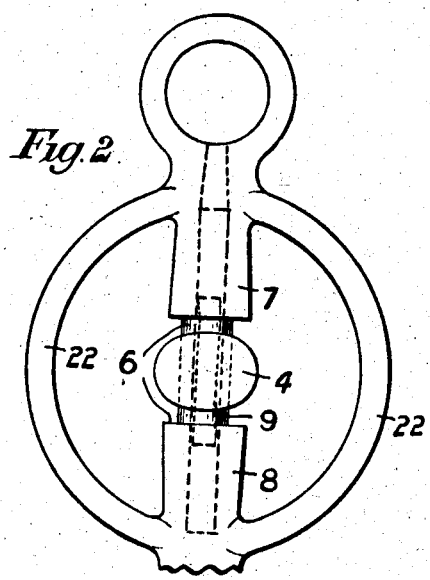
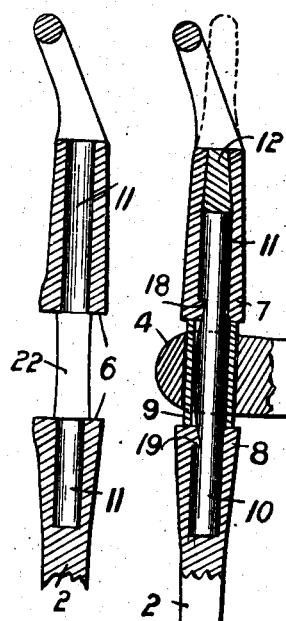
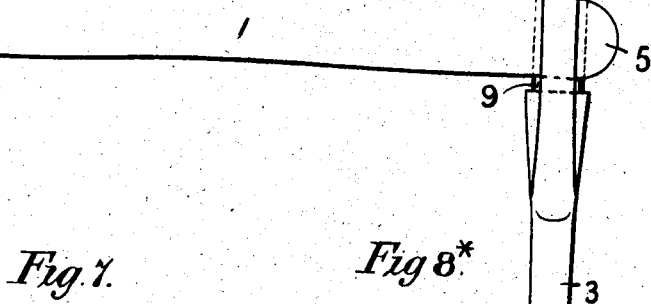
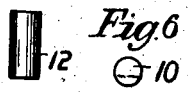
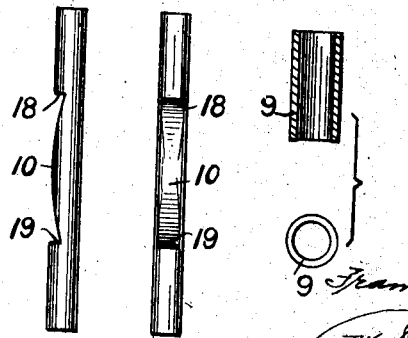
Witnesses
/s/ M. Kuchne
John A. Percival
Inventor
Francis James Beard
By Richardson
Attorney No. 835,092. PATENTED NOV. 6, 1906.
F. J. BEARD.
BRIDLE BIT.
APPLICATION FILED APR. 18, 1905.
3 SHEETS—SHEET 2.
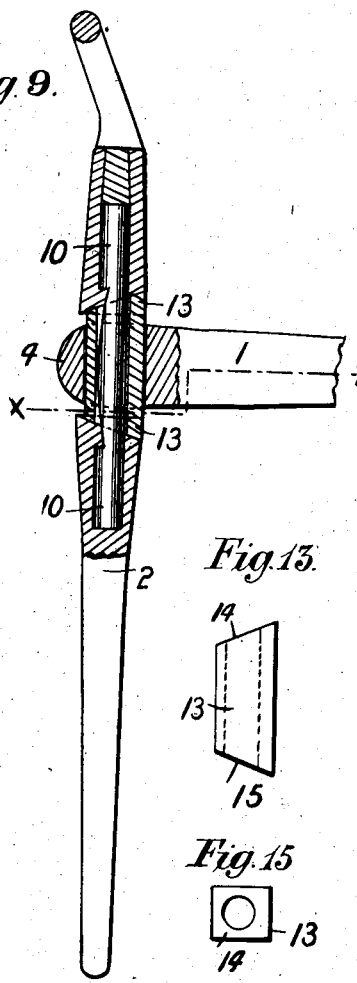
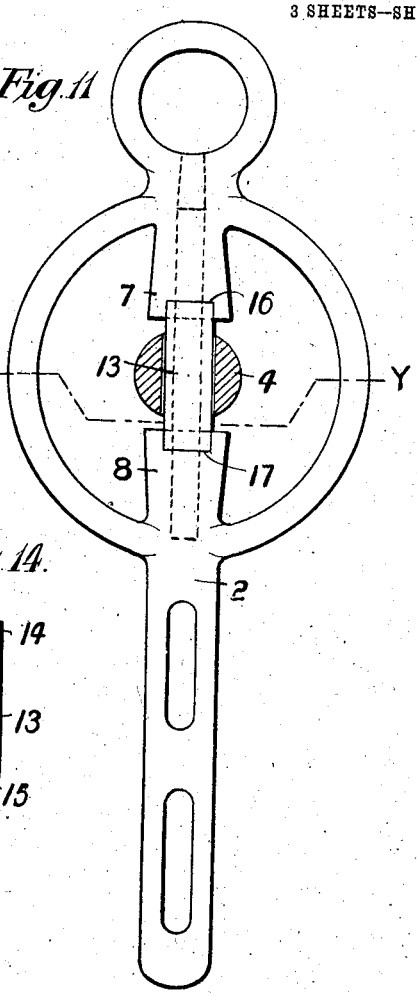
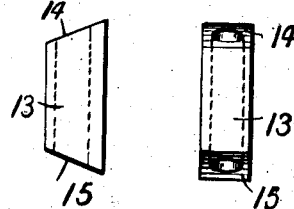
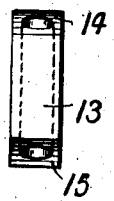
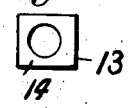
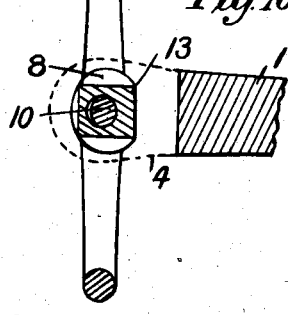
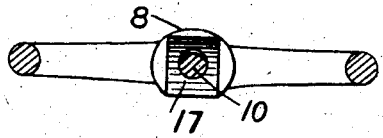
Witnesses.
H. M. Kuehne
John A. Provial
Inventor
Francis James Beard
By Richardson
ATTORNEYS No. 835,092. PATENTED NOV. 6, 1906.
F. J. BEARD.
BRIDLE BIT.
APPLICATION FILED APR. 18, 1906.

3 SHEETS—SHEET 3.

Witnesses
W. M. Kuhne
John A. Percival

Inventor
Francis James Beard
By Richards Jr
ATTORNEYS

THE NORRIS PETERS CO., WASHINGTON, D. C.

UNITED STATES PATENT OFFICE.

FRANCIS JAMES BEARD, OF BLOXWICH, ENGLAND.

BRIDLE-BIT.

No. 835,092.   Specification of Letters Patent.   Patented Nov. 6, 1906.

Application filed April 18, 1905. Serial No. 256,279.

*To all whom it may concern:*

Be it known that I, FRANCIS JAMES BEARD, a subject of His Majesty the King of Great Britain and Ireland, and a resident of 36 High street, Bloxwich, in the county of Stafford, England, have invented new and useful Improvements in Bridle-Bits, of which the following is a specification.

This invention has reference to those bridle-bits, such as Liverpool bits and elbow-cheek carriage-bits and others, in which the mouthpiece or beam is made to slide up and down the cross-bars of the cheeks within certain limits, said cross-bars having stops above and below the mouthpiece to limit the movements of the same.

This invention consists of the herein-described improvements in the construction of the side cheeks so that the ends of the beam or mouthpiece can be made solid instead of being made, as is usual, with jaws which are closed round the cross-bars of the cheeks, so as to slide upon the same.

I will describe my invention by referring to the accompanying drawings, on which—

Figure 16:
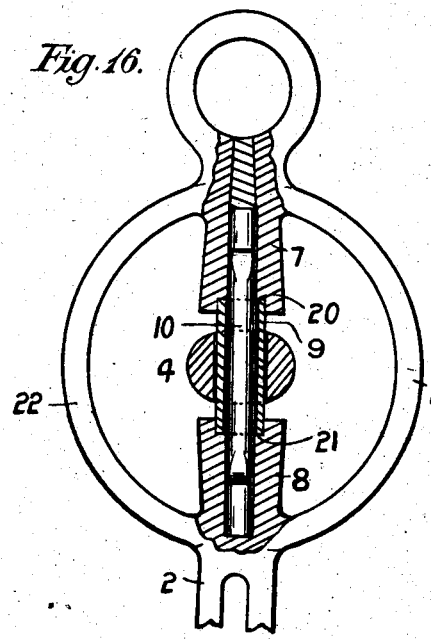
Figure 17:
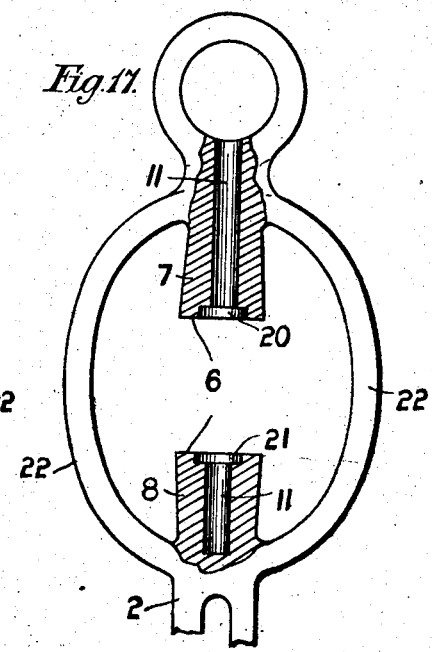
Figure 18:
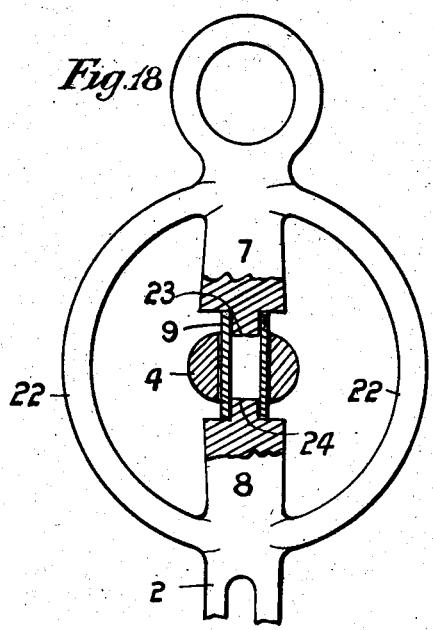
Figure 19:
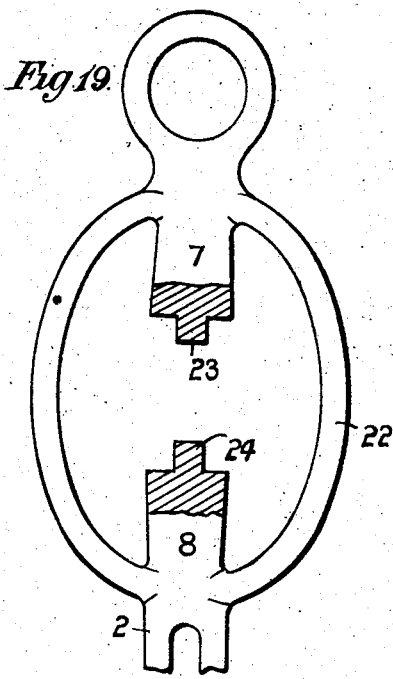

Figure 1 is a front elevation, partly in section, of a bridle-bit constructed in accordance with this invention. Fig. 2 is a side elevation of the main portion of one of the side cheeks of the said bit sufficient to illustrate my invention. Fig. 3 is a sectional side elevation of a portion of one of the side cheeks of the said bit before being attached to the mouthpiece. Fig. 4 is a side elevation, and Fig. 5 is a front elevation, of a pin part of one of the said side cheeks of the bridle-bit. Fig. 6 is a plan of said pin. Fig. 7 is a side elevation of a portion of the said pin. Fig. 8 is a sectional side elevation and plan of a portion of the cross-bar of one of the side cheeks of the said bit on which the the mouthpiece works. Fig. 8× is a sectional elevation and sectional plan of a modified form of said cross-bar for the same cheeks. Fig. 9 is a front elevation, partly in section, of one of the cheeks of a bridle-bit and a portion of the mouthpiece to illustrate a further modification of my invention. Fig. 10 is a sectional plan of the same on line X X of Fig. 9. Fig. 11 is a side elevation of the same cheek looking from the inner side of the bit, this view also showing the mouthpiece in section. Fig. 12 is a sectional plan of the same on line Y Y of Fig. 11. Fig. 13 is a front elevation of the cross-bar portion of the side cheek shown in Figs. 9, 10, 11, and 12. Fig. 14 is a side elevation of the same cross-bar, and Fig. 15 is a plan of the same. Fig. 16 is a side elevation, partly in section, of the main portion of one of the side cheeks of the said bit, illustrating a slight modification of the arrangement shown by Figs. 1, 2, and 3. Fig. 17 shows the same side cheek as Fig. 16 before the cross-bar and mouthpiece are connected thereto. Fig. 18 is a similar view to Fig. 16 to illustrate a further modification of my invention, and Fig. 19 shows the same side cheek as Fig. 18 before the cross-bar and mouthpiece are connected thereto.

The same reference-numerals indicate the same or corresponding parts in all the figures.

I will first describe the arrangement of my invention illustrated by Figs. 1 to 8, both inclusive. 1 is the mouthpiece of the bit, and 2 3 are the two side cheeks of the same. In carrying out my invention the beam or mouthpiece 1 is made solid in one piece, with the eyes 4 5 at its ends to slide upon the cross-bars of the cheeks 2 3, and in order to enable the solid-ended beam 1 to be connected onto the cross-bars of the cheeks 2 3 these cross-bars, of which there is one for each cheek, are, together with the cheeks, constructed as I will now describe, and in order to simplify my description I will refer to only one cheek—that is, the cheek marked 2—and its cross-bar, although it will be understood that the cheek 3 and its cross-bar are similarly constructed. The side cheek 2 is first cast or otherwise formed with a gap 6, where the end 4 of the beam or mouthpiece works, leaving two bosses 7 8 on the side cheek, which bosses 7 8 are in reality portions of the cross-bar, one boss—namely, that marked 7—being above the gap 6 and the other boss 8 being below the gap. The part 9 of the cross-bar on which the end 4 of the beam or mouthpiece slides is made separately from the side cheek 2 in the form of a nickel or other suitable non-rusting short metal tube 9, which is shown separately by Fig. 8 and which is made of the proper length to fit in between the two bosses 7 8 of the side cheek, as shown in Figs. 1 and 2. This tube 9 is threaded through the eye 4 of the mouthpiece or beam 1 and secured in place in the gap 6 by a solid vertical steel or other wire pin 10, which is passed down a central hole 11 from the top of the said cheek through the tube 9 and across the gap 6 and into the lower boss 8 and is there secured by the cheek 2, being riveted over at the top of the pin 10 or by other suitable means, as by the pin 10 being made with two lateral depressions 18 19 on those parts which are inclosed in the bosses 7 8, so that when the pin 10 is in position in the hole 11, as in Figs. 1 and 2, the metal at the front of the bosses can be squeezed into these depressions 18 19, as shown in Fig. 12, thereby effectually securing the pin 9 in position in the hole 11 and preventing the bosses 7 8 from springing apart in case the bit should be dropped on one of the bow parts 22 of the side cheek. When the pin 10 is made of steel, (and this is preferable,) we place in the hole 11 on the top of the pin 10 a small plug 12, (shown separately by Fig. 7,) of nickel or other non-rusting metal, so as to hide the steel pin 10, and this plug is, by preference, made tapering toward the top, as shown in Figs. 1 and 12, so that the hole 11 can be closed round it to secure it in the side cheek. Thus the mouthpiece or beam 1 is effectually secured to the side cheek 2, which latter is rendered very strong, as the steel or other metal pin 10 forms a strengthening-core for the same.

In the arrangement above described with reference to Figs. 1 to 8, both inclusive, the tubular cross-bar 9 is circular in plan, and the eye 4 in the end of the mouthpiece or beam 1 is made of corresponding shape and size to fit onto the tubular cross-bar 9; but it is to be understood that when applying my invention to those bits in which the cross-bars of the cheeks and the eyes of the mouthpiece are made square to prevent the side cheeks from turning then I make the tubular cross-bar square on the outside, as shown in Figs. 9 to 15, both inclusive, in which it will be seen that the tubular cross-bar in this case (marked 13) is made square in plan, and the eye 4 in the end of the mouthpiece or beam 1 is also made square to fit on this square cross-bar 13. In order to prevent the square cross-bar from turning on the pin 10, the ends 14 15 of the said cross-bar are, by preference, made inclined as shown and fitted in inclined slots 16 17, formed in the ends of the bosses 7 8, as shown in Figs. 9, 10, 11, and 12.

For additional security the ends of the short metal tube 9 may, if desired, be sunk into recesses, such as 20 21, in the ends of the bosses 7 8 of the side cheek, and in this case in order to get the cross-bar 9 in position the bow parts 22 of the side cheek, which connect the upper and lower parts of the side cheek together, have to be somewhat flattened, as in Fig. 17, thereby extending the length of the gap 6, so that the short tube 9 can readily be placed in position, and then when this has been done the bosses are forced toward each other again, so that the ends of the tube 9 will fit in the recesses 21 22, and this is done by driving a drift into the bow parts 22, so as to bend the same outwardly to their normal shape, (shown in Fig. 16,) which has the effect of bringing the bosses 7 8 nearer together and gripping the tubular cross-bar 9 between them.

When the tubular or solid cross-bar 9 is fixed in position between the bosses 7 8 by its ends fitting in recesses 20 21, as last described and illustrated by Figs. 16 and 17, then the wire or other pin 10 can, if desired, be dispensed with; but we prefer to use the said pin, as shown in Fig. 16, and to provide it with the indentations 18 19 and to force the substance of the metal of the bosses 7 8 into these indentations, as above described, so as to prevent the bosses 7 8 from separating farther apart in the event of the side cheek being dropped on one of the bow parts 22, as stated above.

In a further modification of this invention (see Figs. 18 and 19) the two bosses 7 8 are formed with short pins 23 24, which project axially from the centers of the bosses 7 8 and take into the holes in the ends of the tubular or other filling-up piece 9, as shown in Fig. 18, which filling-up piece is placed in position by first extending the distance between the bosses 7 8, which is done by squeezing the bow parts 22 toward each other, as stated above, or by casting the side cheek with these bow parts nearer together than in the finished bit, as shown in Fig. 19, and then when the tubular cross-bar 9 is placed in position to engage with the pegs 23 24 the bosses 7 8 are forced together again, so that their pins 23 24 engage in the ends of the filling-up piece or cross-bar 9 and hold the same in position with the eye 4 of the mouthpiece or beam threaded thereon, as shown by Fig. 18.

What I claim as my invention, and desire to secure by Letters Patent, is—

1. A bridle-bit comprising a mouthpiece having an eye at each end, two side cheeks, each composed of a circular portion and two hollow bosses extending inwardly from the circular portion, said bosses being diametrically opposite each other and leaving a gap between their free ends, two tubes passing through the eyes in the mouthpiece and filling the gaps in the side cheeks and bars passing through said tubes and having their ends held in the hollow bosses.

2. A bridle-bit comprising a mouthpiece having an eye at each end, two side cheeks each having an upper and lower hollow boss forming a gap between their free ends, two tubes passing through the eyes of the mouthpiece and filling the gaps, two rods each passing through one of the tubes and having its ends held in the hollow bosses and means for holding the rods in place.

3. A bridle-bit comprising a mouthpiece having an eye at each end, two side cheeks each having an upper and lower hollow boss, forming a gap between their free ends, two tubes threaded through the eyes of the mouthpiece and filling the gaps, a rod for each cheek, said rod passing through the tube and having its ends resting in the hollow bosses and a plug fitting in the top boss to hold the rod in place, said rods having notches therein in which the metal of the bosses are adapted to be pressed.

In testimony whereof I have signed my name to this specification in the presence of two subscribing witnesses.

FRANCIS JAMES BEARD.

Witnesses:
CHARLES BOSWORTH KETLEY,
THOMAS JOHN ROWE.